Aug. 8, 1939.   C. R. DOTY   2,168,441
TELETYPEWRITER
Filed Dec. 12, 1936   2 Sheets-Sheet 1

INVENTOR
Charles R. Doty
BY
W. M. Wilson
ATTORNEY

Aug. 8, 1939.   C. R. DOTY   2,168,441
TELETYPEWRITER
Filed Dec. 12, 1936   2 Sheets-Sheet 2

INVENTOR
Charles R. Doty
BY
ATTORNEY

Patented Aug. 8, 1939

2,168,441

UNITED STATES PATENT OFFICE 2,168,441

TELETYPEWRITER

Charles R. Doty, Binghamton, N. Y., assignor to International Business Machines Corporation, New York, N. Y., a corporation of New York Application December 12, 1936, Serial No. 115,463

4 Claims. (Cl. 197—74)

This invention relates to typewriter control mechanisms and more specifically to mechanisms for controlling the shift mechanisms of typewriters which are remotely controlled in systems such as printing telegraph systems, automatic letter writing systems and the like.

An object of the present invention is to provide separate and individual controlling means and mechanisms to operate the shift mechanisms of typewriters. In the present invention the usual and well known type basket arrangement is shown with the associated shift controlling mechanism. Cooperating with the basket shift mechanism are individual controlling means so that the operation of one of the controlling means is effective to shift the basket from one case to another and further operation of the same controlling means is ineffective for further control purposes, and operation of another of the controlling means is effective to restore the basket to the normal case and further operation of the second said controlling means is ineffective for further control purposes. It will be seen from the description to follow that in remotely controlled typewriters this method of controlling the shifting of the type basket is a positive operation and in such remote control systems assures the operator that the correct shift position is maintained since further operation of the controlling means operated is ineffective to effect any change in the shift position.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

Figure 1:
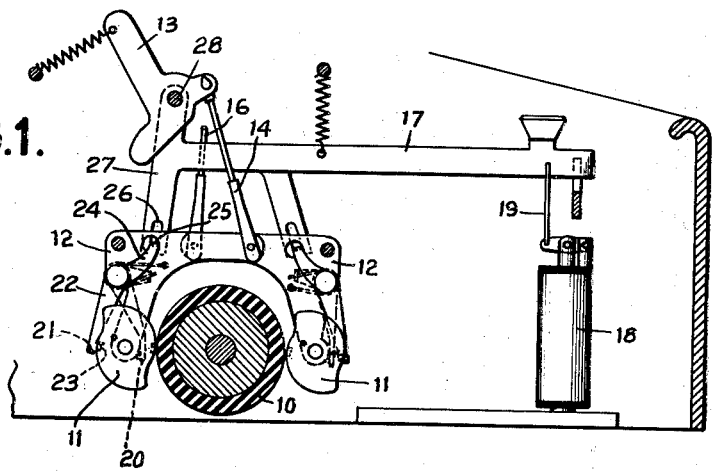
Fig. 1 is a fragmentary sectional elevation of a well known typewriter unit.

Referring now to Fig. 1, in the embodiment illustrated in the drawings, well known means are provided for actuating the type bars and case shift mechanism by power operated devices comprising a power driven roller 10. A cam 11 is pivoted on one arm of a bell crank lever 12 pivoted in the frame, the other arm of which is operatively connected with one arm of a bell crank lever 13 by means of link 14. The other arm of lever 13 is connected to the type bars (not shown) in a well known manner and fully disclosed in the U. S. Patent No. 1,777,055.

The lever 12 is actuated by the cam 11 when the latter engages the driven roller 10 to be operated thereby. The engagement of the cam 11 with the power roller is controlled automatically by means of the solenoid 18 connected to the key bar 17 by link 19. The cam 11 is resiliently engaged by a spring-pressed arm 20 which tends to turn it into engagement with the power driven roller or a stop 21 on a lever 22 pivoted on the bell crank 12 and normally arranged in the path of a lug 23 on the cam. When the lever 22 swings to move its stop out of the path of the lug, the arm 20 swings the cam into engagement with the power roller to be actuated thereby to swing the bell crank 12 to actuate its connected mechanism. The lever 22 has an arm 24 which is provided with an offset projection 25 at its end which projects laterally through an opening in the bell crank 12 and engages the bifurcated lower end 26 of an arm 27 of a key lever 17 pivoted on the common rod 28 and linked to the solenoid 18. It is obvious then that energization of solenoid 18 in causing a key lever 17 to be depressed releases the revolubly mounted cam 11 to engage and be actuated by power roller 10 in turn operating bell crank 12 and its attached links to cause the associated mechanism such as the type bars or case shift mechanism to be operated.

One of the links 16 connected to a bell crank 12 is associated with the case shifting mechanism (not shown) well known in the art and a disclosure of which is given in U. S. Patent No. 1,945,097, issued to R. G. Thompson, et al., January 30, 1934, so that further description is not necessary since the case shifting mechanism itself is not claimed as part of this invention.

It is assumed that similar links as the link 14, Fig. 1, are provided to be connected to individual bell crank levers and associated type bar mechanisms, and that the link 16 shown in the figure is connected to one of the controlling bell crank levers associated with the shift mechanism (see Fig. 4) which will be described in detail hereinafter.

Individual solenoids 18 attached to each controlling key bar 17 as shown in Fig. 1 may be provided as one means of controlling the key bars and systems embodying individual control solenoids are well known such as the single impulse communication systems or automatic letter-writing systems in which single control impulses are utilized.

Figure 2:
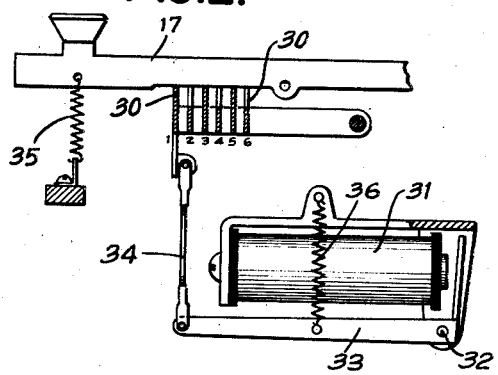
Fig. 2 is a detail sectional view of one form of permutation bar controlling unit.
Figure 3:
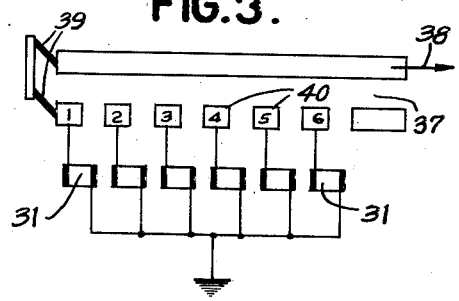
Fig. 3 shows schematically a receiving circuit in which the control magnets may be employed.

However, it is not desired to be limited to the specific systems just mentioned, for it will be obvious that the applications of the present invention are manifold. Referring to Figs. 2 and 3, a modified key bar selection system is shown and comprises a well known form of permutation bar mechanism to effect selection of the individual key bars. For purposes of illustration, six permutation bars 30 are shown disposed beneath the key bars 17, the individual bars slotted so that upon depression of a certain combination of the bars an individual key bar is permitted to be depressed. Associated with each permutation bar 30, there is a controlling magnet 31, the armature of which is pivoted at 32 and secured to an arm 33 which is fastened to a connecting link 34 cooperating with the corresponding permutation bar 30; therefore, upon energization of the magnet 31, the corresponding permutation bar 30 is lowered. It is seen, in Fig. 2, permutation bars 30—1, 3, and 5 must be lowered to permit the selection of the individual key bar 17 shown in the figure; the operation of the bars 30 then permits the spring 35 to urge the key bar downwardly which as described hereinabove operated the associated mechanism. Upon decay of the signal, spring 36 restores the operated parts to the normal position shown in the figure. One method of energizing the control magnets 31 is shown in Fig. 3, in which the rotary distributor 37 is operated in synchronism with the incoming signals from the line 38 and transferred to the individual magnets 31 by means of the brushes and individual conducting segments 40. This method of selection is old and well known and is believed to require no further description therefor. It should be mentioned that the characteristics of the magnets 31 are such that the inherent lag and adjustments thereof are such that once energized to lower the permutation bars 30, release of the bar is not effected immediately but is delayed for the necessary timed interval required for the brushes 39 to energize the remaining magnets 31. Of course, it is obvious that in certain systems the synchronous distributor 37 is not necessary; for example, each controlling magnet 31 may be connected directly and individually to the signal source as for example in multi-wire control systems such as automatic letter-writing systems and multi-wire communication or signaling systems.

Figure 4:
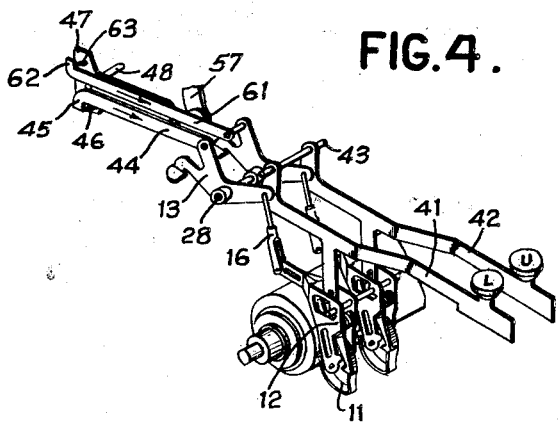
Fig. 4 is an isometric view of the individual controlling mechanisms for shifting the type basket.

Referring now to Fig. 4, a simplified view of the individual key bar control mechanisms for the shift position control is shown and the key bars 41 and 42 are for lower and upper case control respectively. The said key bars are suitably supported in the typewriter frame similarly as the character key bars 17 described in connection with Fig. 1. The key bars 41 and 42 are shown pivoted on a common rod 43, and arranged when each key bar is depressed and pivoted about the rod 43 to release the associated cam 11 revolubly mounted in the corresponding bell crank member 12, in exactly the same manner as described hereinabove. Assume that the lower case key bar is depressed thereby releasing the associated cam 11, displacing the corresponding bell crank lever 12, link 16, bell crank lever 13 to position the lever 44, pivoted on one arm of the bell crank lever 13, in the direction indicated in the figure. The depending finger 45 of lever 44 when positioned momentarily as mentioned due to the cam displacement is adapted to engage a pin 46 protruding from a toggle lever 47 which is pivoted at 48.

Figure 5:
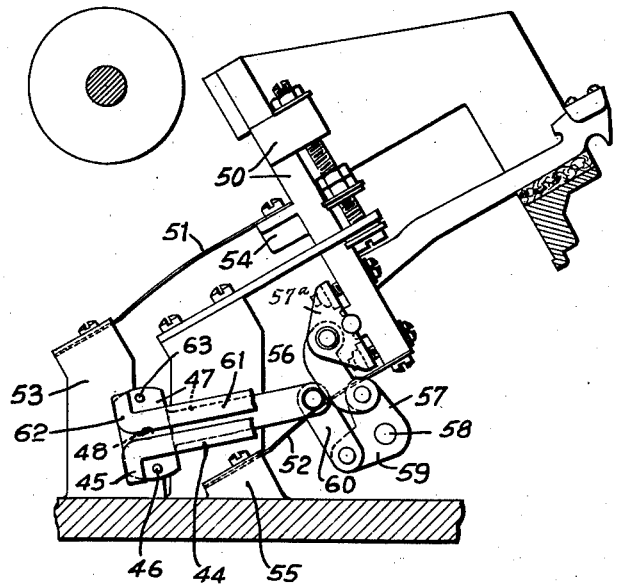
Fig. 5 is a simplified detail view showing the shift mechanism operated for one case position.

Whenever the pin 46 is in the path of the positioned lever 44, the lever is effective to rotate the toggle lever 47 about its pivot to raise the type basket to its upper or normal position as shown in Fig. 5. The type basket 50 is mounted on the free front ends of a plurality of leaf springs 51 and 52. It will be understood that two of each of said springs are employed, one at each side of the type basket. The springs 51 are secured at their rear ends to brackets 53 projecting from the frame and extend upwardly and forwardly therefrom and at their free ends are secured to lugs 54 projecting rearwardly from the type basket. The springs 52 are secured at their rear ends to brackets 55 projecting from the frame and extend upwardly and forwardly therefrom in substantially parallel relation to the springs 51, and at their forward ends are secured to the type basket. By this arrangement, the type basket is resiliently supported and guided in its case shift movements on the free ends of the springs 51 and 52. The basket positioning means in the embodiment illustrated comprises two toggles so arranged that one or the oher is in its straightened position when the type basket is shifted to one or the other of its printing positions. One of said toggles comprises the link 56 pivoted at one end to a bracket 57 projecting rearwardly from the type basket. The other end of the link 56 is pivoted to the arm 57 of a bell crank lever fixed on one end of a rock shaft 58 mounted on a fixed part and extending to the other side of the type basket. The other arm 59 of the bell crank is connected with the toggle lever 47 by means of link 60. By this arrangement the link 56 and arm 57 constitute in effect a toggle moved to its straight position when the type basket is in its upper or normal position as seen in Fig. 5. For a more detailed description of the shift mechanism proper which forms no part of the present invention, reference may be made to Patent No. 1,945,097.

Figure 6:
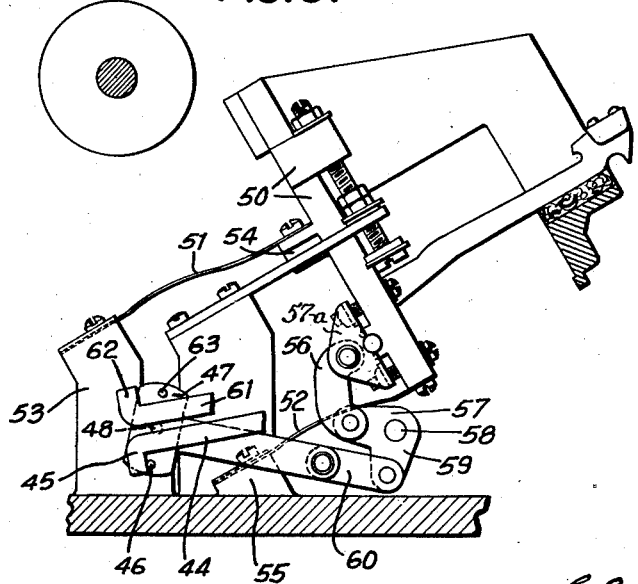
Fig. 6 is a similar view as Fig. 5 showing the shift mechanism operated for another case position.

It is obvious from the description just set forth that if the toggle lever 47 had been positioned previously so that the type basket is in position for upper case as shown in Fig. 6, and the lower case key bar 41 now is depressed to position the lever 44 as explained, it is seen that the pin 46 would be engaged by the lever 44 to pivot the toggle lever 47 and position the connected links and toggles described in the position shown in Fig. 5, for lower case printing. It is also seen that further depression or operation of the key bar 41, positioning lever 44 momentarily, is ineffective to alter the type basket position, since the pin as shown in Fig. 5 is not engaged by lever 44 for its full stroke.

However, if the upper case key bar 42 is now depressed, the associated cam 11 and bell crank lever 12 are displaced to position the connected bell crank lever 13 and the attached lever 61 which is displaced similarly and in the same direction as lever 44. The said lever 61 is provided with an extension finger 62 adapted to now engage the protruding pin 63 on the toggle lever 47, rotating the lever 47 clockwise about its pivot 48. The toggle lever 47 and link 60 constitute in effect a second toggle movable from the broken position in Fig. 5 to the straightened position shown in Fig. 6 in which the pivotal points of the link 60 are in substantial alinement with the pivot of the lever 47 when the type basket is shifted to its lower position. Similarly, further operation of the key bar 42 is ineffective to further affect the positioning of the type basket. Further explanation of this toggle mechanism is not deemed necessary because this type mechanism is known in the art and described in the aforesaid patent.

The individual and independent operation of the controlling shift key bars 41 and 42 may be effected by any of the methods shown depending upon the type of remote control system employed, thereby providing independent controlling and positioning means for the type basket effecting the desired case shift.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A typewriter of the character described comprising, in combination, a type basket, a toggle lever and associated control links cooperating with the type basket to control the positioning thereof, and individual and separate control members associated with the toggle lever including means to control the positioning of the toggle lever to effect different positioning of the type basket.

2. A typewriter of the character described comprising, in combination, a type basket, common operating means cooperatively connected to the type basket, a plurality of power operated devices, and individually and independently operated control means associated with each of said devices for controlling the operation of the said common means to effect different positioning of the type basket.

3. A typewriter of the character described comprising, in combination, a type basket, common operating means cooperatively connected to the type basket, and individually and independently operated control means for controlling the operation of the common means to effect different positioning of the type basket comprising individual power operated devices and individual connecting means between said devices and individual control means.

4. A device of the character described comprising, in combination, printing instrumentalities, common operating means to control the case positioning of said instrumentalities, and individual control means upon operation thereof to effect positioning of the instrumentalities from one case position to another, said control means comprising individual key bars, associated power operated devices and individual connecting means interconnecting said devices and control means, each group of individual key bars, power operated devices, and individual connecting means being arranged independently so that operation of one group is not effective to effect operation of the other group.

CHARLES R. DOTY.